July 21, 1931. G. W. ALLEN ET AL 1,815,088
GAS OVEN ELECTRIC HEATER
Filed Oct. 4, 1929
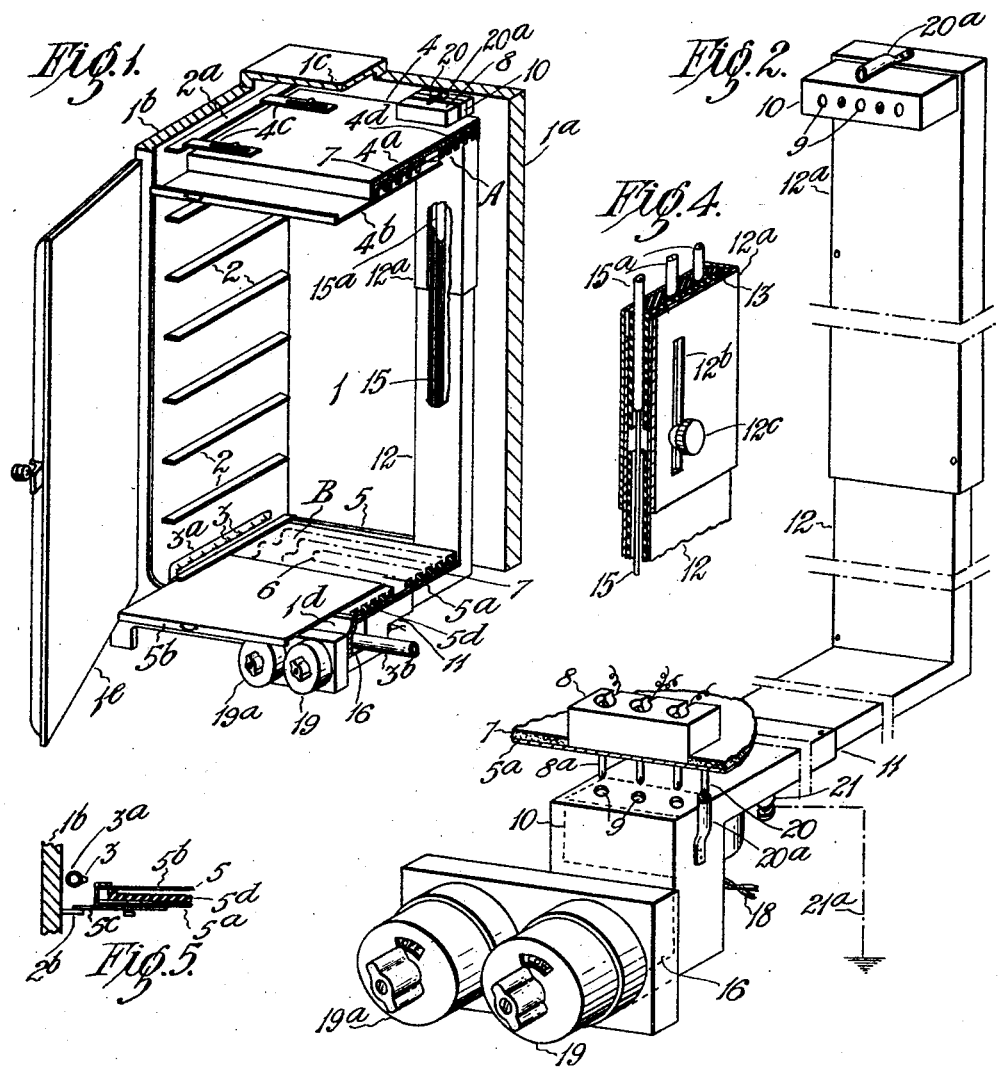
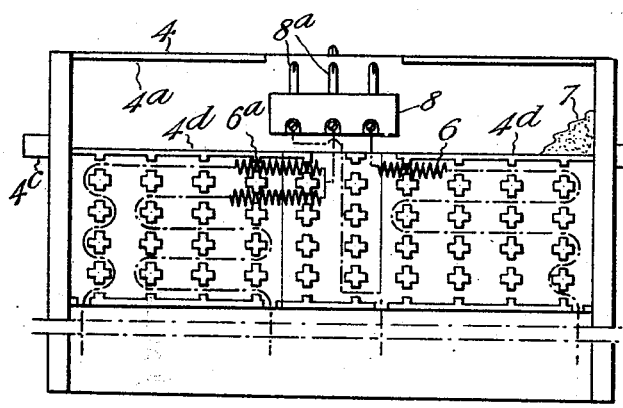
INVENTORS:
G. W. Allen &
A. Waters
By Marks & Clerk
Attys.

Patented July 21, 1931

1,815,088

UNITED STATES PATENT OFFICE

GEORGE WILLIAM ALLEN AND AMBROSE WATERS, OF MALVERN, VICTORIA, AUSTRALIA

GAS OVEN ELECTRIC HEATER

Application filed October 4, 1929, Serial No. 397,361, and in Australia July 4, 1929.

One object of our invention is to make existing gas stove ovens more efficient, by providing electric heat at the top and bottom, or when desired at either part. This electric heat is to be used in addition to or in place of gas heat the heat being produced at will, not only at the top and bottom but also at each side—the side heat being gaseous. Just as the gaseous heat can be regulated in well known manner, so the electric heat can be increased or decreased at will.

Another object is to provide attachments which can be fitted to gas stoves of various forms and dimensions.

A further object is to provide readily renewable heating elements for the said attachments.

This invention thus allows the total heat to be in excess of that which the normal gas stove gives and it allows of compensation for variations of gas heat due to variations of gas pressure. Hitherto many complaints have been made that the gas pressure has fallen so low that food could not be properly cooked.

Other features of this invention will be apparent from the description following.

Our heating elements at the oven top are connected to a downwardly extending conduit, of adjustable or if desired fixed length, located in the oven, and our elements at the oven bottom are connected to an extension of the said conduit.

The heating elements are encased, but parts of the casings are removable wholly or partly; for brevity we term the cased elements upper and lower trays respectively, and these trays have supports in the oven. One effect of the invention is to materially extend the utility of gas stoves, without much additional expense; and another is to prevent the scrapping of such stoves when it is intended to substitute electric heat for gaseous in the ovens.

The drawings herewith show an embodiment of this invention, but details can be varied while retaining characteristics within the scope of the claims.

Figure 1 is a perspective sectional view of an open gas oven having our attachments.

Figures 2 to 5 are on a larger scale.

Figure 2 is a perspective view of the conduit and part of the lower tray.

Figure 3 is a plan from beneath of part of the upper tray, with its cover removed.

Figure 4 is a sectional perspective rear view of part of a conduit.

Figure 5 is a horizontal section showing part of the lower tray, and an adjacent part of the oven.

In these figures, 1 represents a gas stove oven, having a back $1^a$, sides $1^b$ (one shown) top $1^c$, front $1^d$, and door $1^e$, each side having any usual shelf ledges 2, $2^a$. Gas jets 3 are on piping $3^a$, extending from a feed pipe $3^b$ in any suitable position but shown crossing the oven front.

Instead of using upper ledges $2^a$ to support a food carrying slide, we utilize them to support our electric upper tray.

We find flat heating trays 4, 5, suitable, each having a casing $4^a$, $5^a$, which includes a slidable covering $4^b$, $5^b$. These trays have movable members to rest on oven supports and ovens of different internal dimensions will thus take the trays. The conduits also can be adjustable to suit ovens of different dimensions. $4^c$, on tray 4, are the said movable tray members, shown as slides. When projected to suit the oven width these members rest on ledges $2^a$. The movable tray members, shown as slides on tray 5, are marked $5^c$ in Figure 5 and when projected these rest on any convenient supports shown as oven ledges $2^b$.

Each tray contains non-conducting material—for example a series of porcelain blocks, $4^d$, $5^d$, carrying heating wires 6 suitably retained by undercut projections $6^a$ for example, the wiring being suited to develop predetermined heats. Adjacent to these blocks heat-insulating material shown as asbestos sheeting 7 is located between the block and the casing at parts not facing the oven interior.

Each tray has an electric plug 8 having contacts shown as pins $8^a$ which enter counterparts shown as sockets 9 of a block 10 on a conduit which is shown formed of adjustable sections 11, 12, 12ᵃ adapted to be set to regulate the conduit height, and its depth from front to rear. For fixing purposes 12ᶜ is a set screw entering conduit slot 12ᵇ—see Figure 4.

The conduit casing encloses insulation 13 protecting electric conductors, shown as telescoping sections 15, 15ᵃ which allow of the adjustment aforesaid. The lower part of the conduit is horizontal and has a foot shown at the oven front, the foot being forward of a conduit recess 16 which houses the foot of the oven front 1ᵈ.

From main conductors 18 wires extend to suitable switches, 19, 19ᵃ, which allow a user to apply any of several heats, as three from each switch, wiring extending to plugs 10 and thus to one or more of the heating wires of the trays. Heat from the upper, and heat from the lower tray is independently producible and regulatable.

To expose a greater or less area of heating wire of either or each tray to the oven interior, we illustrate a movable casing member on each tray. These members are shown as slides and are shown partly drawn out exposing heating wires at A at the oven top and at B at the oven base.

If only gentle electric heat is required the slide is fully closed; if more top heat is required the top or ceiling slide is opened to the extent found suitable. Similarly with the bottom or floor slide. Obviously the cook can at will use the oven with either tray removed.

Each insulating block if it becomes damaged or requires new heating wire can be easily and cheaply attended to, even by a novice,—if the latter be shown or instructed how to do what is necessary.

The trays are to be connected to earth before completing the electrical circuits, and said earthing is maintained until said circuits are dismantled. Thus on each casing pin 20 engages a socket 20ᵃ on a conduit, having a terminal 21 from which an earthing wire 21ᵃ is extended.

We claim:—

1. Gas stove oven attachments for electric heat supply, comprising a tray containing heating elements located to form the oven ceiling, and a tray containing heating elements, located to form the oven floor, each tray having movable members to engage supports on oven walls to locate the trays.

2. The combination with a gas stove oven, of a pair of electrically heated trays, means for supporting one tray at the top of the oven and the other at the bottom thereof, an electric conductor including a vertical and a horizontal member, each member consisting of adjustably connected sections, one section of each member having sockets carried thereby, and pins carried by the trays adapted to engage said sockets, as and for the purpose set forth.

3. The combination with a gas stove oven, of an electrical conducting member comprising a vertical and a horizontal member, the member consisting of longitudinally adjustably connected sections, the members extending respectively along the back and bottom of the oven, one section of each member having a socket carried thereby, a pair of trays, one tray constituting a ceiling for the oven, the other tray constituting a floor therefor, each tray having pins carried thereby for engaging said sockets, and switches associated with the conductor for controlling the circuit through the conductor to the trays.

In witness whereof we have hereunto signed our names to this specification at Melbourne, in the State of Victoria, in Australia, this 29th day of August, 1929.

GEORGE WILLIAM ALLEN.
AMBROSE WATERS.